United States Patent [19]

Benjaminson

[11] Patent Number: 4,472,793

[45] Date of Patent: Sep. 18, 1984

[54] DATA SELECTOR CIRCUIT WITH CHANNEL SKIPPER FOR DATA ACQUISITION SYSTEM

[75] Inventor: Albert Benjaminson, Arlington, Va.

[73] Assignee: Eastport International, Inc., Lanham, Md.

[21] Appl. No.: 381,969

[22] Filed: May 25, 1982

[51] Int. Cl.³ .......................... G01S 15/34; H04J 3/16
[52] U.S. Cl. ...................................... 367/102; 370/79; 340/870.13; 343/7 A
[58] Field of Search ....................... 370/79, 84, 80, 82, 370/83; 367/79, 102; 340/870.13; 343/14, 7 A

[56] References Cited

U.S. PATENT DOCUMENTS

| | | | |
|---|---|---|---|
| 3,588,364 | 6/1971 | Wallingford et al. | 370/79 |
| 3,864,524 | 2/1975 | Walker | 370/80 |
| 3,939,463 | 2/1976 | Kelly et al. | 367/102 |

Primary Examiner—Richard A. Farley
Attorney, Agent, or Firm—Schwartz, Jeffery, Schwaab, Mack, Blumenthal & Koch

[57] ABSTRACT

The data selection circuit includes a multiplexer circuit which receives a plurality of inputs and individually connects each of the inputs to an output line. The multiplexer is sequenced by signals from a timing circuit which causes inputs having a higher signal level to be connected to the multiplexer output for a greater length of time. The data selection circuit is particularly suitable for enhancing the image on a CRT of a continuous tone frequency modulated sonar system.

7 Claims, 2 Drawing Figures

DATA SELECTOR CIRCUIT WITH CHANNEL SKIPPER FOR DATA ACQUISITION SYSTEM

BACKGROUND OF THE INVENTION

1. Field of the Invention

This invention relates to data acquisition systems and more particularly to data acquisition systems in which individual signals are selected from a multi-line input and displayed on a cathode ray tube such as is done in continuous tone frequency modulated sonar systems.

2. Discussion of Related Art

In a conventional continuous tone frequency modulated (CTFM) sonar, a transmitter having a transducer ensonifies the water about the transducer, and echoes from objects in the beam of the transducer are converted to frequencies which are proportional to the range of the objects from the transducer. The recovered information is applied to a bank of filters, each tuned to pass a narrow band of frequencies, ranging from the lowest to the highest frequencies of interest. For example, forty filters, each having a 50 hz bandwidth and ranging from 500 hertz to 2500 hertz may be used. The outputs of the filters are rectified and applied to a data acquisition circuit which comprises a multiplexer. The multiplexer is stepped in sequence by a fixed clock frequency system so that the output of each filter channel is transferred in turn to the output of the multiplexer for eventual display or further processing. An equal amount of time is allowed for the multiplexer to dwell on each channel regardless of the amount of useful signal information contained in the channel. Such a system is shown and described in U.S. Pat. No. 3,939,463 to Kelly et al., the disclosure of which is incorporated herein by reference. This system will be described in further detail hereinafter with reference to FIG. 2 of the attached drawings.

A difficulty with the Kelly et al. system is that during any particular scan, only a limited number of the channels presented to the data acquisition system contain useful information. Because all the channels are accessed for an equal amount of time, those channels containing only noise are displayed on the screen with equal priority to those channels containing useful information. Consequently, the display of an object sensed by the sonar system may appear to be very weak or flicker, thus making the display very difficult to read. Consequently, a need has developed for increasing the clarity of the display in such a sonar system.

Other systems which use data acquisition circuits are also known. For example, U.S. Pat. No. 4,118,701 to Brey et al. shows a radar system wherein there is transmitted a signal of constant amplitude which linearly varies with frequency at a selected rate for some selected range of detection. In the detection process, the received signal is processed and used to modulate a frequency responsive light deflector through which is passed a narrow beam of light. A plurality of photosensitive elements are positioned to incrementally pick up the beam over a calibrated deflection range. The output of each photosensitive element is fed through a threshold detector which provides an output when there appears a signal greater than uncorrelated noise.

U.S. Pat. No. 3,789,350 to Rolle shows an ultrasonic imaging system having a plurality of channels. Each channel produces a signal, which signals are individually sampled by multiplexer gates in accordance with an order of succession determined by a multiplexer logic. The peak of each signal during each pulse period is detected and held so that it may be displayed during the next succeeding pulse period or a length of time greater than that for which it could be displayed during the pulse period in which it is generated.

U.S. Pat. No. 3,701,089 to Cowan discloses a display for multi-channel sonar systems in which outputs from the sonar receiver are converted to video signals which are coupled directly to the grid or cathode of a cathode ray tube in order to improve the display associated with low frequency signals.

U.S. Pat. No. 4,259,734 to Hormel discloses a water depth measuring system in which pulse signals are transmitted and received. The signals may be of any one of four different frequencies. In the receiver circuit, AND gates are enabled in order to be responsive only to echoes expected in a given time window.

SUMMARY OF THE INVENTION

One object of the present invention is to provide a data selector for data acquisition systems in which channels having significant information content are accessed for greater periods of time than channels having no significant signal content.

Another object of the present invention is to provide a data selector with channel skipping capability which can be used in a variety of data acquisition systems, including, but not limited to, continuous tone frequency modulated sonar systems.

A still further object of the present invention is to provide a data selector with channel skipping capabilities which is relatively simple to fabricate, yet highly reliable and effective in use.

Yet another object of the present invention is to provide a data selector with channel skipping capabilities which can be used with a data display device to provide a signal which appears to be much brighter on the display device while suppressing noise or other low level signals.

In accordance with the above, and other objects, the present invention is a data selection circuit for use in data acquisition systems. The data selection circuit comprises a multiplexer connected to a plurality of input lines for receiving data signals from the lines and individually connecting the input lines to an output line, thus transferring the data signals to the output line. A timing circuit is connected to receive the data signals from the output line and produces sequencing signals at timed intervals which vary in dependence upon the signal level on the output line. The sequencing signals are applied to the multiplexer for sequencing the multiplexer between the input lines. Accordingly, the amount of time for which a particular input line is connected to the output line of the multiplexer is dependent upon the signal level present on that input line.

The timing circuit comprises a comparator circuit which receives inputs from the multiplexer output lines and a reference value generator. The signals on these inputs are compared and the resultant signal is passed to a pulse producing circuit. The pulse producing circuit provides a pulse having a first pulse width when the signal level on the output line of the multiplexer is above the reference value and provides a pulse having a second width when the signal level on the multiplexer output line is below the reference level.

The output from the pulse producing circuit is passed through an input of a counter circuit, the output of which is connected to the multiplexer. The counter circuit is incremented by the pulses from the pulse producing circuit at timed intervals determined by the width of those pulses.

The pulse producing circuit comprises a first monostable multivibrator for producing a pulse having a first width and a second monostable multivibrator for producing a pulse having a second width. An electronic switch is responsive to the output of the comparator circuit for actuating either the first or second monostable multivibrator.

The pulse producing circuit also includes a third monostable multivibrator whose output is connected to an input of the electronic switch. This multivibrator has an input connected to the pulses from the first and second multivibrators. The output of the third multivibrator is used to actuate either the first or second multivibrator, dependent upon the setting of the electronic switch. In turn, an output from the actuated first or second multivibrator increments the counter circuit and also reactuates the third multivibrator.

BRIEF DESCRIPTION OF THE DRAWINGS

The above and other objects of the present invention will become readily apparent as the invention is more completely described in the following detailed description, reference being had to the accompanying drawings in which like reference numerals represent like parts throughout, and in which:

FIG. 1 shows the data selector circuit of the present invention. The circuit comprises an analyzer section 31, a data skipper section 41 and a timing counter 35. The analyzer section 31 contains a filter bank 50 and a multiplexer 52. An input line 30 contains a signal having a plurality of frequency components which are divided into individual signals within discrete frequency bands by filter bank 50. The output of filter bank 50 is passed through data bus 51 to multiplexer circuit 52. It should be understood that while the inputs for multiplexer 52 are derived through filter bank 50 from a single input line 30, any plurality of inputs can be applied to the multiplexer. Multiplexer 52 can be any standardly available integrated circuit multiplexer, such as a CD4067 multiplexer manufactured by RCA. The number of input lines which can be accepted by the multiplexer is dependent on the particular multiplexer circuit chosen. In the example shown, data bus 51 can contain up to sixteen input lines which are individually accessed in dependence upon the binary number present on address bus 60, which contains four lines. If more than 16 input lines are handled by the circuit, a plurality of multiplexers similar to multiplexer 52 can be used and accessed by one address bus 60 which would contain a sufficient number of address lines to operate all multiplexers.

Figure 1:
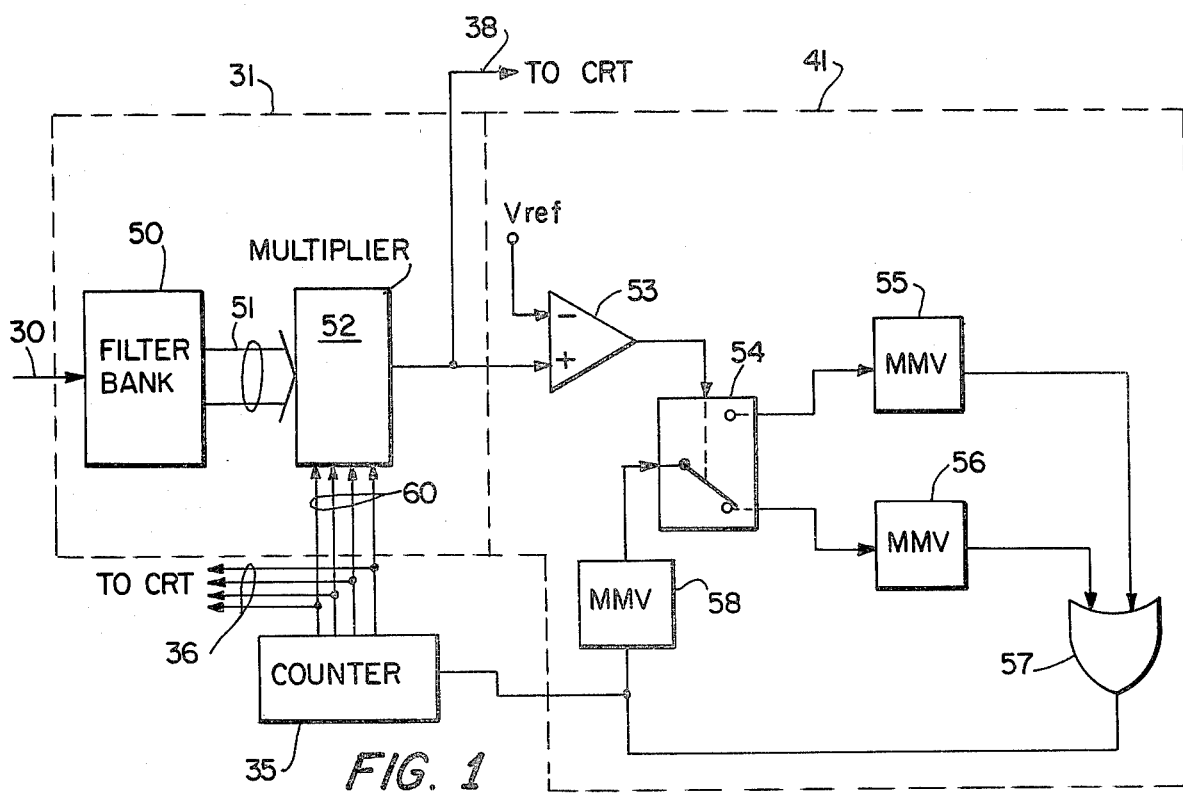
FIG. 1 is a block diagram of the data selection circuit of the present invention.

The output of multiplexer 52 is taken on line 38 and passed to a display device such as a CRT, or other end use device. The out is also presented to the non-inverting input of a voltage comparator 53 of the data skipper section 41. The inverted input of ampifier 53 receives a reference voltage value. Voltage comparator 53 compares the signal level on the output line of multiplexer 52 to the reference voltage level and outputs a logic signal indicative of this difference to switch 54. Switch 54 receives an input from monostable multivibrator 58. This input is connected either to the input of monostable multivibrator 55 or the input of monostable multivibrator 56, dependent upon the condition of switch 54. Switch 54 can be any conventional electronic switching circuit and is operative to connect the output of multivibrator 58 to the input of multivibrator 55 when the output of voltage comparator 53 goes high. The output of multivibrator 58 is connected to the input of multivibrator 56 when the output of comparator 53 is low.

Multivibrators 55 and 56 are similar circuits except that the pulse width of the signal emitted by multivibrator 55 has a period $T_1$ of 50 microseconds while the period $T_2$ of multivibrator 56 is 1 microsecond. The outputs of both multivibrators are fed to OR gate 57 whose output is passed to a counter 35 and to monostable multivibrator 58. Multivibrator 58 has a period $T_3$ equal to one microsecond. Each of the monostable multivibrators can be a type CD4098 multivibrator with the pulse width adjusted to the proper amount.

Counter 35 can be a type CD4024 integrated circuit counter. The input to counter 35 is taken from the output of OR gate 57 and the output of counter 35 is passed on address bus 60 to the address terminals of multiplexer 52. As discussed above, multiplexer 52 has 16 inputs which it receives on bus 51. The four lines of address bus 60 are capable of generating 16 addresses which are uniquely associated with the 16 inputs of bus 51. Each time a pulse is received from counter 31, the counter is incremented by one count and the address on bus 60 is incremented thus sequencing multiplexer 52. In this manner, the input lines on input bus 51 are sequentially accessed in dependence upon the number of pulses received by counter 35 for a time duration dependent upon the period of the pulses.

In operation, when the data selection circuit is initially turned on, multivibrator 58 is initially set by circuitry which is not shown, but the construction of which would be obvious to one of ordinary skill in the art. Multivibrator 58 thus produces an initial 1 microsecond pulse. At the same time, the signal received on line 30 by filter bank 50 is divided into 16 individual frequency increments and presented to the 16 inputs of multiplexer 52. The output of multiplexer 52 contains the data signal on the input line which is associated with the address represented by address bus 60 at that particular time. The output is presented on line 38 to an end use device such as a CRT, and also presented to voltage comparator 53. If the signal level on line 38 is higher than the reference value presented to differential amplifier 53, the output of comparator 53 is high, causing a switch 54 to operate to connect the output of multivibrator 58 to multivibrator 55. The operation of the circuit to this point takes less than one microsecond to complete. At one microsecond, multivibrator 58 times out and the trailing edge of the initial 1 microsecond pulse produced at the turn on of the circuit signal causes multivibrator 55 to actuate, thus producing a pulse having a width of fifty microseconds. The fifty microsecond pulse is passed through OR gate 57 to multivibrator 58 and counter 35. The trailing edge of the fifty microsecond pulse triggers multivibrator 58 and increments counter 35. Accordingly, the next succeeding input on bus 51 is accessed by multiplexer 52 and presented to output line 38. The sequence of operation is then repeated as discussed above for a signal on line 38 which is greater than the reference signal. If the signal is below the reference signal applied to comparator 53, switch 54 is moved to the position shown schematically in FIG. 1, wherein the output of multivibrator 58 is connected to multivibrator 56. It will be remembered that multivibrator 56 has a pulse width of one microsecond. Accordingly, when multivibrator 58 times out, the trailing edge of the pulse produced thereby will trigger multivibrator 56. The one microsecond pulse from multivibrator 56 will be passed through OR gate 57 to multivibrator 58 and counter 35. The trailing edge of this pulse will again trigger multivibrator 58 and increment counter 35 to access the next input on bus 51. The circuit continues to operate in this manner sequentially accessing each of the inputs on bus 51.

As will be understood from the above discussion, the cycle time for the data selection circuit is either 1+50 microseconds, or 1+1 microseconds. The signals having the higher values on line 38 are presented to the end use device for the greater length of time. This results, in the case of the signals being displayed on a CRT, in the signals having more information being displayed for a greater length of time, thus producing a much brighter display on the CRT, while the lower level signals on below par channels are suppressed due to an unfavorable duty cycle. It will be of course understood that the period of the pulses from multivibrators 55 and 56 can be varied to suit individual needs, thus increasing or decreasing the duty cycle for above and below level signals.

In the case where the information on line 58 is to be displayed on a CRT, timing signals for the CRT are generated by counter 35 and are passed through timing bus 36 to a sweep generator or other timing circuit for the CRT as would be obvious to one of ordinary skill in the art.

Figure 2:
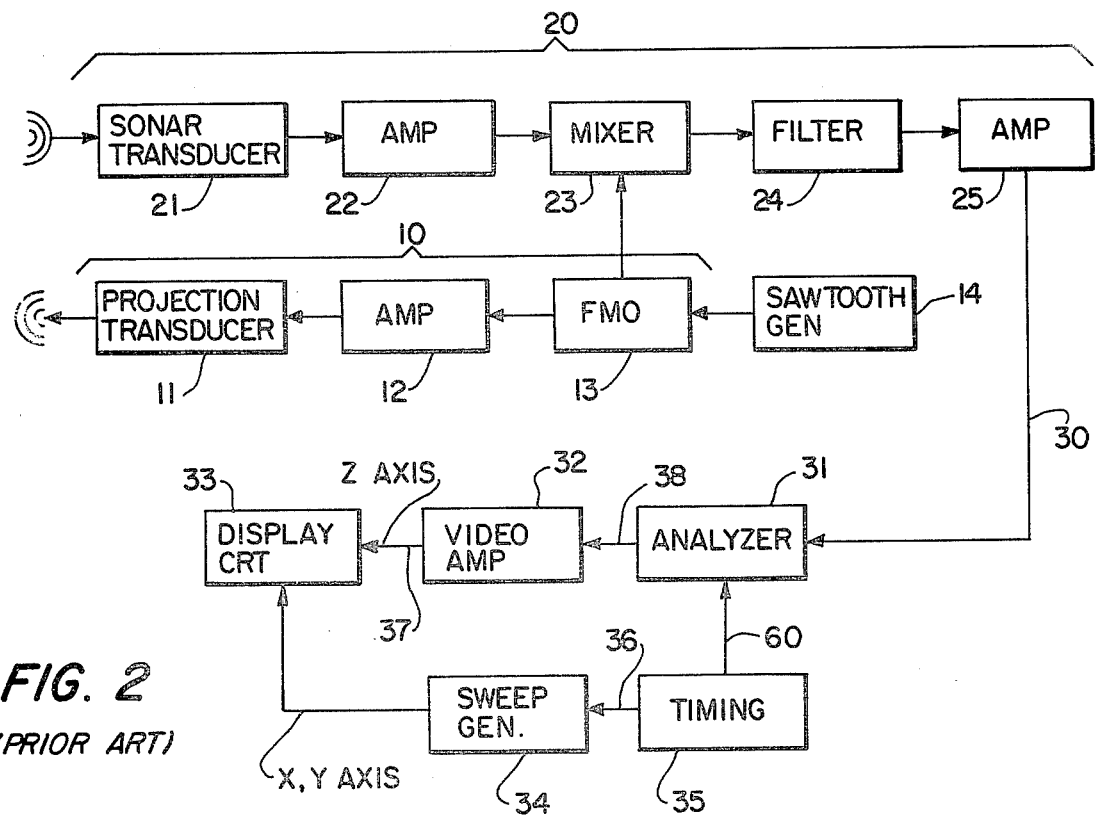
FIG. 2 is a block diagram showing a portion of a sonar system in which the data selection circuit of FIG. 1 may be used.

FIG. 2 shows a portion of a sonar system, such as that disclosed in above mentioned U.S. Pat. No. 3,939,463. The sonar system includes a ship's station which comprises sonar transmitter 10 and sonar receiver 20. Transmitter 10 includes a projection transducer 11 which is used to ensonify water surrounding a ship on which the sonar is mounted. The tranducer produces a directional beam and is preferably continuously rotated by a motor. A power amplifier 12 energizes the transducer and is, in turn, driven by an oscillator 13. Oscillator 13 is a frequency modulated oscillator, the frequency of oscillation of which is driven by a sawtooth wave from sawtooth generator 14 so that the frequency of the oscillator changes linearly with time and moves gradually between two predetermined frequency limits and abruptly starts over.

The transmitted sawtooth wave is reflected back from any reflecting object and is received by sonar transducer 21 of sonar receiver 20. After amplification in amplifier 21, the received echo signals are combined with the transmitted frequencies in mixer 23. It should be apparent that, since the velocity of propogation of the ensonified waves through the water is finite, there is a definite relationship between the distance travelled by the wave and the difference between the frequency of a wave at the instant it is transmitted outwardly and at the same instant, the frequency of the wave received from the echo. That is, the distance the wave has travelled from the projection transducer out to the reflecting object and back to the sonar transducer becomes a function of the difference frequency between the transmitted and the received waves.

This frequency difference is obtained in mixer 23, which combines the transmitted frequency from oscillator 13 with the received frequency at the output of receiver pre-amplifier 22. The output of the mixer is passed through broad low pass filter 24 and amplifier 25.

The output of sonar receiver 20 is connected to analyzer 31 which converts frequency information to range information. A plurality of equal width bandpass filters are contained in analyzer 31. The bandpass filters are tuned to adjacent bands to cover the entire frequency range passed by the filters. Analyzer 31 also contains a multiplexer which receives the output from each of the filters. Each of the inputs to the multiplexer is accessed for an equal amount of time by timing circuit 35. When accessed, information on each input is passed through line 38 to a video amplifier 32 which amplifies the signal and passes it to the Z axis input of CRT 33. At the same time, the timing signals from timing circuit 35 are passed through line 36 to sweep generator 34, which provides the X and Y axis inputs for CRT 33.

Typically, the signal passed from amplifier 25 on line 30 to analyzer 31 of the sonar system of FIG. 2 is divided into forty adjacent frequency channels. Each channel is typically displayed for fifty microseconds with a cycle time of two microseconds. If a signal for only one echo is present, the signal is displayed for one fortieth of the cycle time.

The data selector circuit shown in FIG. 1 contains an analyzer section 31 and counter 35 which are equivalent to analyzer 31 and timing circuit 35 of the sonar system of FIG. 2. In addition, the circuit of FIG. 1 contains data skipper circuitry 41 which improves channel selection. The circuitry of FIG. 1 can thus be substituted directly for the analyzer and timing circuitry of the sonar system. In this case, as would be understood from the discussion above, the sonar signal on line 30 would be divided into a plurality of adjacent frequency channels and presented to multiplexer 52. Each of the inputs to multiplexer 52 would be displayed on CRT 33 for a time duration dependent upon the signal level on that channel. Using the example of a single channel with echo information versus 39 empty channels, the signal, using the present invention, is displayed for fifty microseconds out of a total of 50+(39×2) or 50/128 or nearly two-fifths of the time. This results, in the case of the sonar system, in the signal appearing to be much brighter on the CRT display, while the noise, or low level signals on below par channels is suppressed due to an unfavorable duty cycle of 1/128.

It will be understood that the data selection circuit of the present invention can be used in systems other than sonar systems and can be used in sonar systems other than that described above. Also, further modifications, additions or changes can be made to the circuit of the present invention as would be obvious to one of ordinary skill in the art. The embodiment of the present invention described above is set forth herein for purposes of illustration and is not meant to limit the protection being sought for the invention, the scope of which is set forth in the appended claims.

What is claimed is:

1. In a data acquisition system, a data selection circuit for receiving information in the form of data signals on a plurality of input lines, and transmitting said information along an output line, comprising:
   multiplexer circuit means connected to said plurality of input lines for receiving data signals on said lines and individually connecting said input lines to an output line in response to sequencing signals; and timing circuit means connected to receive said data signals from said output line for producing and applying said sequencing signals to said multiplexer circuit means at time intervals which vary in dependence upon the signal level on said output line.

2. The data selection circuit as set forth in claim 1 wherein said timing circuit means comprises comparator circuit means for comparing the signal level on said output line with a reference value, and pulse producing circuit means responsive to said comparator means for producing a pulse having a first width when said signal level is above said reference value and producing a pulse having a second width when said signal level is below said reference value, said multiplexer circuit means being sequenced at time intervals dependent upon said pulse widths.

3. The data selection circuit as set forth in claim 2 wherein said timing circuit means further includes counter circuit means having an input receiving said pulses from said pulse producing circuit means and having an output connected to said multiplexer circuit means, wherein each time a pulse is received by said counter circuit means, a sequencing signal is sent to said multiplexer circuit means on the output of said counter circuit means.

4. The data selection circuit as set forth in claim 3 wherein said pulse producing circuit means includes a first monostable multivibrator for producing a pulse having said first pulse width, a second monostable multivibrator for producing a pulse having said second pulse width, and switch means responsive to said comparator means for actuating either said first multivibrator or said second multivibrator.

5. The data selection circuit as set forth in claim 4 wherein said pulse producing circuit means further includes a third monostable multivibrator having an output connected to an input of said switch means and having an input connected to receive the pulses from said first and second monostable multivibrators, and wherein said switch means is operative to connect the output of said third monostable multivibrator to the input of either said first monostable multivibrator or the input of said second monostable multivibrator in response to said comparator means.

6. A data selection circuit as set forth in claim 5 and further in combination with an acoustic detection system including:
   transmitter means for continuously ensonifying a sector of water with sonic energy varying in frequency between two frequency limits;
   receiver means for sensing echo frequencies and producing an output signal having a frequency which is related to the difference between a received echo frequency and a transmitted frequency;
   filter means for receiving the output signal of said receiver means and dividing it into a plurality of filter output signals, each of said filter output signals having a different frequency range; and
   display means for displaying said filter output signals,
   wherein said input lines connected to said multiplexer comprise said filter outputs, and said multiplexer output is connected to said display means, whereby said filter outputs are individually connected to said display means and displayed for time durations dependent on the signal content thereof.

7. The data acquisition circuit as set forth in claim 1 and further including display means connected to said multiplexer output for displaying the data signals received on said multiplexer output, said display means comprising a cathode ray tube having X, Y and Z axis inputs, said multiplexer output being applied to said Z axis input, and further wherein said timing circuit means is connected to circuitry for controlling said X and Y axis inputs such that said data signals received by said display means are displayed for time durations dependent upon the signal level thereof.

* * * * *